(12) United States Patent
McNulty et al.

(10) Patent No.: US 10,365,162 B2
(45) Date of Patent: Jul. 30, 2019

(54) LASER WAVELENGTH DETECTORS

(71) Applicant: Goodrich Corporation, Charlotte, NC (US)

(72) Inventors: Peter C. McNulty, Sandy Hook, CT (US); Charles Alte, Danbury, CT (US)

(73) Assignee: Goodrich Corporation, Charlotte, NC (US)

( * ) Notice: Subject to any disclaimer, the term of this patent is extended or adjusted under 35 U.S.C. 154(b) by 370 days.

(21) Appl. No.: 15/166,960

(22) Filed: May 27, 2016

(65) Prior Publication Data

US 2017/0343411 A1    Nov. 30, 2017

(51) Int. Cl.
  *G01J 1/00*    (2006.01)
  *G01J 9/00*    (2006.01)
(52) U.S. Cl.
  CPC ..................... *G01J 9/00* (2013.01)
(58) Field of Classification Search
  CPC ...... G01J 1/0488; G01J 1/1626; G01J 1/4228; G01J 1/4257; G01J 2001/161; G01J 2001/1657
  USPC .......................................... 250/226, 214 PR
  See application file for complete search history.

(56) References Cited

U.S. PATENT DOCUMENTS

| | | |
|---|---|---|
| 5,824,567 A | 10/1998 | Shih et al. |
| 5,999,271 A | 12/1999 | Shih et al. |
| 6,097,487 A | 8/2000 | Kringlebotn et al. |
| 6,144,025 A * | 11/2000 | Tei .......................... G01J 1/44 250/206 |
| 6,714,566 B1 | 3/2004 | Coldren et al. |
| 6,992,774 B2 | 1/2006 | Creasey et al. |
| 7,418,025 B2 | 8/2008 | Harker |
| 8,548,016 B2 | 10/2013 | Wagner et al. |
| 9,134,174 B2 | 9/2015 | Jungwirth |

* cited by examiner

*Primary Examiner* — Kevin K Pyo
(74) *Attorney, Agent, or Firm* — Locke Lord LLP; Scott D. Wofsy; Joshua L. Jones

(57) ABSTRACT

A laser wavelength detector includes first and second sensors having a common field of view. A filter having two or more monochromatic attenuation coefficients optically couples the second sensor to the field of view. The filter attenuates incident monochromatic laser illumination detected by the second sensor more heavily than incident monochromatic laser illumination detected by the first sensor such that wavelength of incident laser illumination can be identified according to a ratio of first and second sensor intensities.

16 Claims, 5 Drawing Sheets

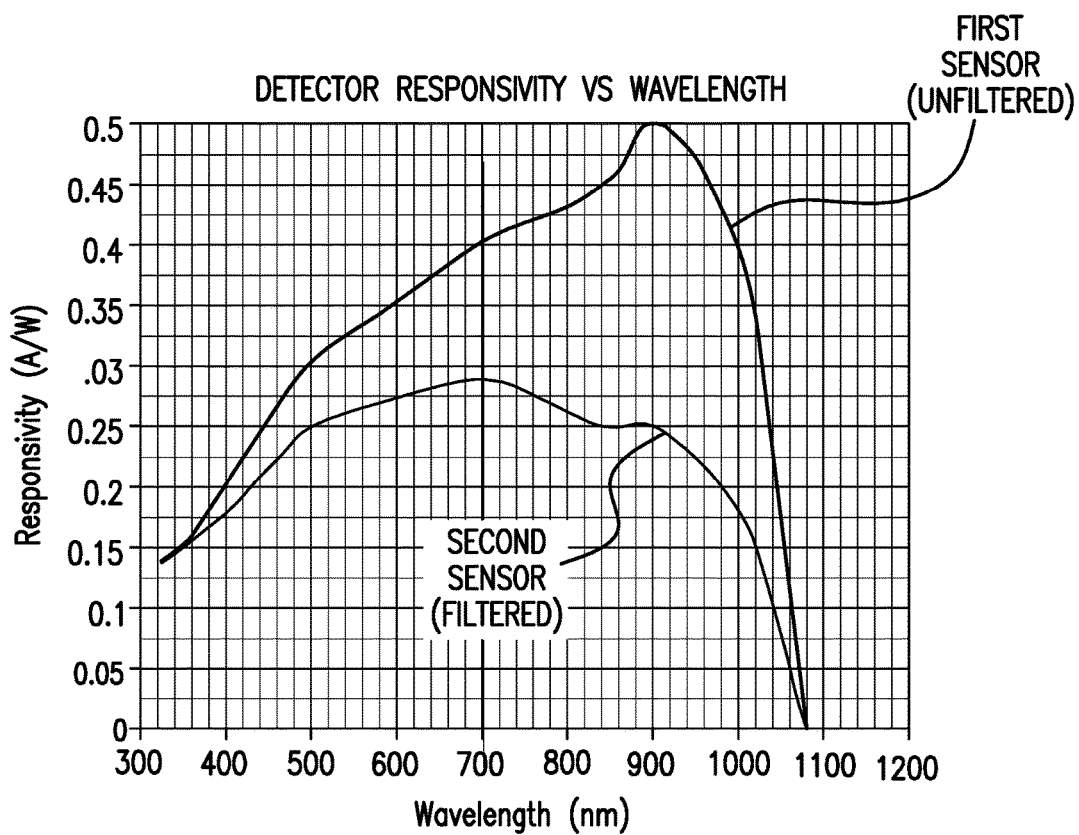
FIG. 4
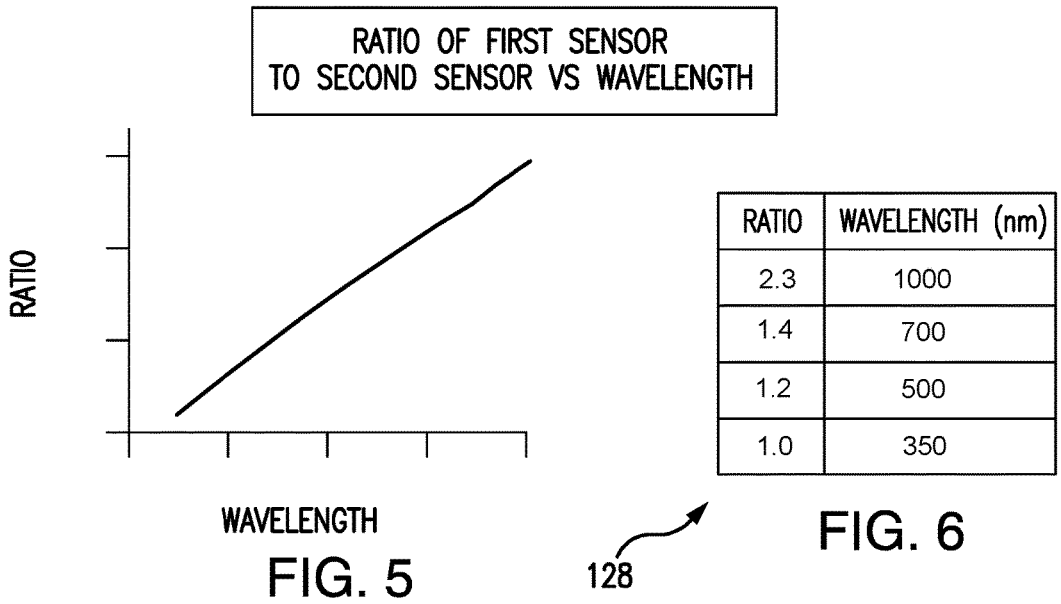
FIG. 5
FIG. 6

LASER WAVELENGTH DETECTORS

BACKGROUND OF THE INVENTION

1. Field of the Invention

The present disclosure relates to laser warning systems, and more particularly laser detection and warning systems.

2. Description of Related Art

With the proliferation of laser devices incidents involving hand-held lasers being directed at aircraft have become increasingly common. While exposure to hand-held laser may seem trivial due the relatively short duration of the exposure and large distances involved, exposure to hand-held laser light under certain circumstances may create dangerous conditions, such as flash blindness of the pilot. If this occurs during a critical moment in aircraft operation, such as landing or during certain flight tasks, the temporary blindness can have disastrous consequences. Furthermore, laser light can cause temporary or permanent damage to the eye. Reliable detection and identification of the type and direction of laser radiation may be critical to pilot safety.

Additionally, military pilots are not only at risk of temporary blindness due to hand-held lasers, but are also subject to being "designated" by laser targeting devices. Generally, in connection with military aircraft, laser detection devices register laser radiation from laser rangefinders or laser designators and, by a warning signal, make clear to the designated aircraft, e.g., the pilot, that laser illumination has occurred or is continuing. Reliable detection and identification of laser radiation may be critical to mission success and accurate information relative to the type of laser may provide for appropriate countermeasures.

Such conventional methods and systems have generally been considered satisfactory for their intended purpose. However, there is still a need in the art for improved wavelength discriminator devices and methods. The present disclosure provides a solution for this need.

SUMMARY OF THE INVENTION

A laser wavelength detector includes first and second sensors having a common field of view. A filter having two or more monochromatic attenuation coefficients optically couples the second sensor to the field of view. The filter attenuates incident monochromatic laser illumination of a first wavelength more heavily than incident monochromatic laser illumination of a second wavelength such that wavelength of incident laser illumination can be identified according to a ratio of first and second sensor intensities.

In certain embodiments, the filter can have an attenuation coefficient that varies between about 0.05 and about 0.9 according to wavelength within a predetermined wavelength range. The filer filter can have a transmission coefficient that is between about 0.95 and 0.1. The filter can have an attenuation coefficient that varies within a wavelength range extending between about 350 nanometers and about 1200 nanometers. Either or both of the first sensor and the second can include a PIN photodetector. External baffling can bound the field of view.

In accordance with certain embodiments, illumination received by the first sensor can be unfiltered. An intensity response of the first sensor can be matched to an intensity response of the second sensor within a predetermined wavelength detection range of the detector. The intensity response of the first sensor can be unmatched to an intensity response of the second sensor within a predetermined wavelength detection range of the detector.

It is also contemplated that, according to certain embodiments, the detector can include a control module. The control module can be communicative with the first sensor and the second sensor. The control module can be responsive to instruction to receive intensity measurements from both the first and second sensors. The instructions can cause the control module to determine a ratio the first sensor intensity to the second sensor intensity. The instruction can cause the sensor to determine wavelength of laser illumination incident the detector based on the ratio of the sensor intensities. The control module can be communicative with a memory, and memory can have recorded on it lookup table with two or more intensity ratios each associated with a laser wavelength. A user interface can be operatively connected to the control module, and control module can provide indication of incident laser illumination to the user interface.

A method of determining wavelength of pulsed laser illumination incident on a detector includes receiving laser illumination of unknown wavelength at first and second sensors, measuring intensity of the laser illumination using a first sensor, and measuring intensity of the laser illumination using a second sensor. The intensity measurement from the first sensor is compared to the second sensor, and wavelength of the incident laser illumination is determined based on a ratio of the intensity from the first sensor and the intensity from the second sensor.

In certain embodiments, receiving laser illumination can include receiving laser illumination at an aircraft while in flight. Measuring intensity of laser illumination using a first sensor can include measuring unfiltered laser illumination. Comparing the first and second intensity measurements can include determining a ratio of intensity reported by the first sensor with intensity reported by the second sensor. The wavelength of the received laser illumination can be determined by association of the ratio with a wavelength in a wavelength lookup table. An output can be provided to a user interface based on the determined wavelength. The laser illumination can be divided into first and second portions, the first portion being provided to the first sensor without filtering, the second portion being filtered prior to reaching the second sensor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a graph of sensor responsivity as a function of incident laser illumination upon the laser wavelength detectors of FIG. 1 and FIG. 2, showing the unfiltered response of the first sensor response and the filtered response of the second sensor;

FIG. 5 is a graph of the ratio of responses of the first and second sensors of the laser wavelength detector of FIG. 1 and FIG. 2, showing a wavelength-unique ratio throughout a predetermined detection range of the laser wavelength detector;

FIG. 6 is an exemplary embodiment of a lookup table of the wavelength detector of FIG. 1 and FIG. 2, showing associations of sensor response ratios with laser wavelengths.

DETAILED DESCRIPTION OF THE PREFERRED EMBODIMENTS

Figure 1:
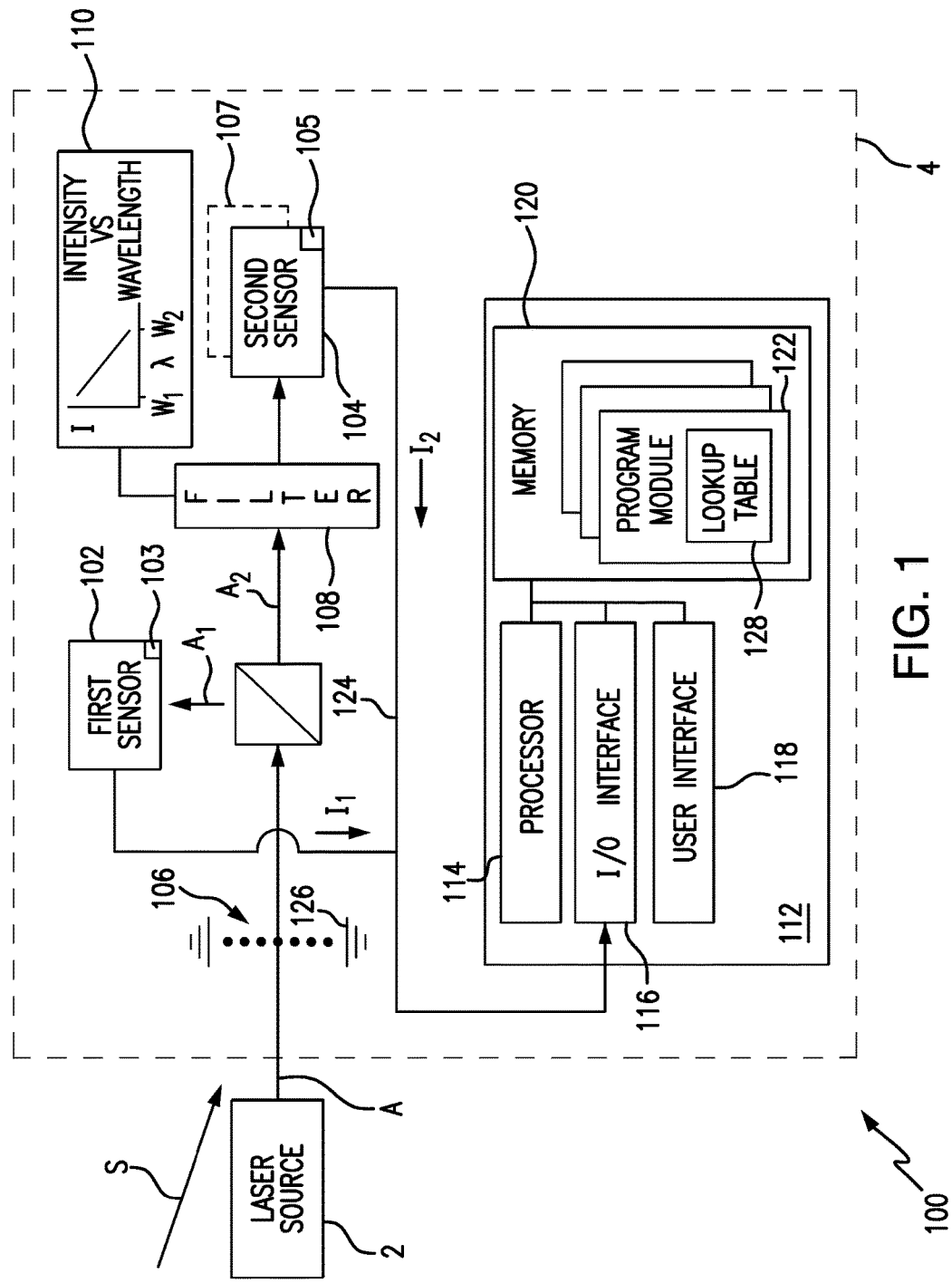
FIGS. 1 and 2 are schematic views of exemplary embodiments of wavelength detectors constructed in accordance with the present disclosure, showing first and second sensors receiving monochromatic pulsed laser illumination from a common field of view.

Reference will now be made to the drawings wherein like reference numerals identify similar structural features or aspects of the subject disclosure. For purposes of explanation and illustration, and not limitation, a partial view of an exemplary embodiment of laser wavelength detector in accordance with the disclosure is shown in FIG. 1 and is designated generally by reference character 100. Other embodiments of laser wavelength detectors, laser wavelength detection systems, and methods of determining laser wavelength in accordance with the disclosure, or aspects thereof, are provided in FIGS. 2-7, as will be described. The systems and methods described herein can be used in aircraft for detecting aircraft lasing events, though the present disclosure is not limited to aircraft or to lasing events in general.

Referring to FIG. 1, laser wavelength detector 100 is shown. Laser wavelength detector 100 includes a first sensor 102 and a second sensor 104 with a common field of view 106, which may be a shared aperture or collector. First sensor 102 is optically coupled to field of view 106 such that first sensor receives unfiltered laser illumination.

A filter 108 optically couples second sensor 104 to field of view 106. Filter 108 is arranged such that monochromatic laser illumination A, within the wavelength range a predetermined wavelength band, e.g., an attenuation coefficient function 110 in a predetermined wavelength band $W_1$ to $W_2$, incident upon filter 108 and sensed by second sensor 104 is more heavily attenuated than incident monochromatic laser illumination A sensed by first sensor 102. In certain, attenuation coefficient function 110 has wavelength-specific coefficients within the predetermined wavelength band $W_1$ to $W_2$. Attenuation coefficient function 110 allows for identification of the wavelength of incident laser illumination A according to a ratio of a first intensities $I_1$ and a second intensity $I_2$, which are reported by first sensor 102 and second sensor 104 to a wavelength determination engine, illustrated in an exemplary way as a control module 112. Although a particular function is shown, i.e. having a negative attention coefficient 110 can have a positive slope and/or may have a polynomial or other arbitrary shape.

In the illustrated exemplary embodiment, first sensor 102 is unfiltered and second sensor 104 is filtered. In this respect a first portion $A_1$ of laser illumination received from field of view 106 reaches first sensor 102 with some attenuation. Second portion $A_2$ of laser illumination received from field of view 106 reaches second sensor 104 with greater attenuation for a given wavelength than first portion $A_1$ reaching first sensor 102. Arranging laser wavelength detector 100 with an unfiltered and a filtered sensor increase the sensitivity of the detector, increasing the ranges at which incident laser wavelengths can be identified. In certain embodiments, a second sensor 204 (shown in dashed outline in FIG. 1) with responsivity matched to first sensor can be utilized, allowing use of filters that selectively attenuate according to wavelength of laser illumination.

Either or both first sensor 102 and second sensor 104 can include a PIN photodetector. In this respect first sensor 102 can include a first PIN photodetector 103 and second sensor 104 can include a second PIN photodetector 105. Incorporating PIN photodetectors in first sensor 102 and second sensor 104 reduces the cost of laser wavelength detector 100. As will appreciated by those of skill in the art in view of the present disclosure, other types of photodetectors can be used, such as P/N devices, photomultipliers, and/or any other suitable device.

A baffle 126 bounds field of view 106. Baffle 126 limits the effect of a solar background S, improving sensitivity of laser wavelength detector 100 to incident laser illumination in the presence of solar background S. As will be appreciated by those of skill in the art in view of the present disclosure, limiting the effect of solar background S renders wavelength detector able to detect laser source 2 at relatively long ranges, such as when laser wavelength detector is employed in an aircraft 4. In the illustrated exemplary embodiment baffle 126 is associated with a single aperture of laser wavelength detector 100.

A control module 112 is communicative with first sensor 102 and second sensor 104. Control module 112 includes a processor 114, an input/output (I/O) interface 116, a user interface 118, and a memory 120. Memory 120 includes a non-transitory machine-readable medium having one or more program modules 122 recorded thereon. The one or more program modules 122 have instructions recorded thereon that, when read by processor 114, cause processor 114 to execute certain operations of a method 200 (shown in FIG. 3), as will be described. Processor 114 is communicative with first sensor 102 and second sensor 104 over a link 124, which may be a wireless or wired connection, as suitable for a given application, through I/O interface 116. Processor 114 is also communicative with a user interface 118, which may be an alert device arranged in an aircraft cockpit and configured and adapted to provide countermeasure instructions to aircrew according to the detected wavelength of radiation incident upon laser wavelength detector 100. Although a particular arrangement is shown, it is to be appreciated and understood that control module 112 can include firmware, software, and/or a combination of firmware and software. In certain embodiments, control module 112 is implemented as a field programmable gate array device, simplifying arrangement of laser wavelength detector 100.

Figure 2:
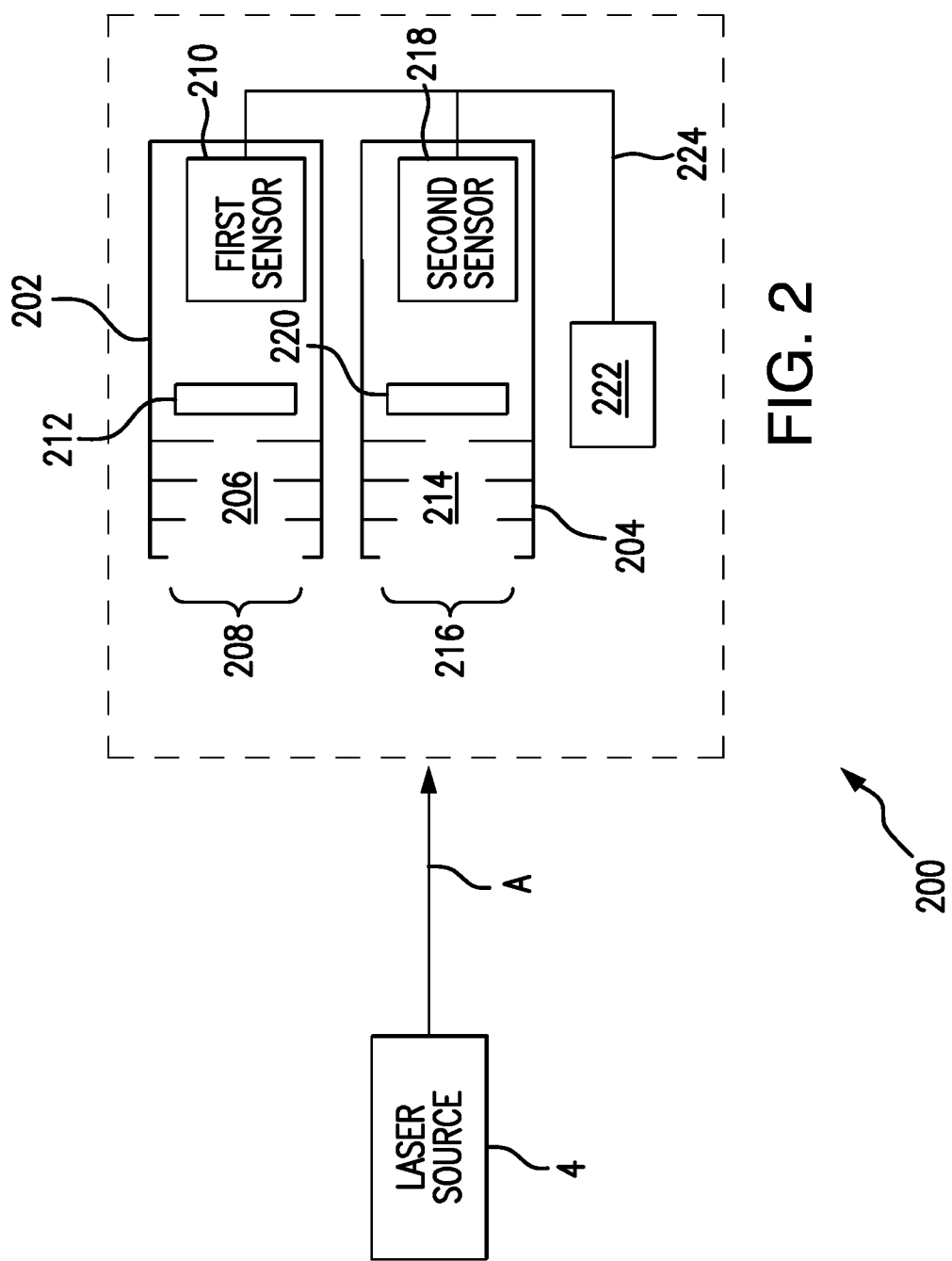

With reference to FIG. 2, a laser wavelength detector 200 is shown. Laser wavelength detector 200 is similar to laser wavelength detector 100 (shown in FIG. 1), and additionally includes a first baffle 202 and a second baffle 204. First baffle 202 defines a first aperture 206 with a field of view 208. A first sensor 210 is optically coupled to field of view 208 by a clear window 212, which is optional. Laser illumination A from laser source 4 enters first aperture 206 through field of view 208, traverses clear window 212, and is received by first sensor 210. First sensor 210 reports intensity of the received laser illumination A to control module 222 over a link 224.

Second baffle 204 defines a second aperture 214 with a field of view 216. In the illustrated exemplary embodiment second aperture 214 is separate from first aperture 206, and field of view 216 is substantially equivalent to field of view 208. A second sensor 218 is optically coupled to field of view 216 by a filter 220. Laser illumination A from laser source 4 enters second aperture 214 through field of view 216, traverses filter 220 (which attenuates laser illumination A), and is received by second sensor 218. Second sensor 218 reports intensity of the received laser illumination A to control module 212 over a link 224. Control module 222 determines a ratio of intensities reported by first sensor 210 and second sensor 107, compares the ratio to an intensity ratio/wavelength lookup table, and determines wavelength of laser illumination according to association of the determined intensity ratio with wavelength in the lookup table. First baffle 202 and second baffle 204 define respective optical axes that are parallel and insensitive to polarization over the field view, eliminating the need for a beam splitter or similar precision optical device that would otherwise have to manufactured to be insensitive to polarization over the field view.

Figure 3:
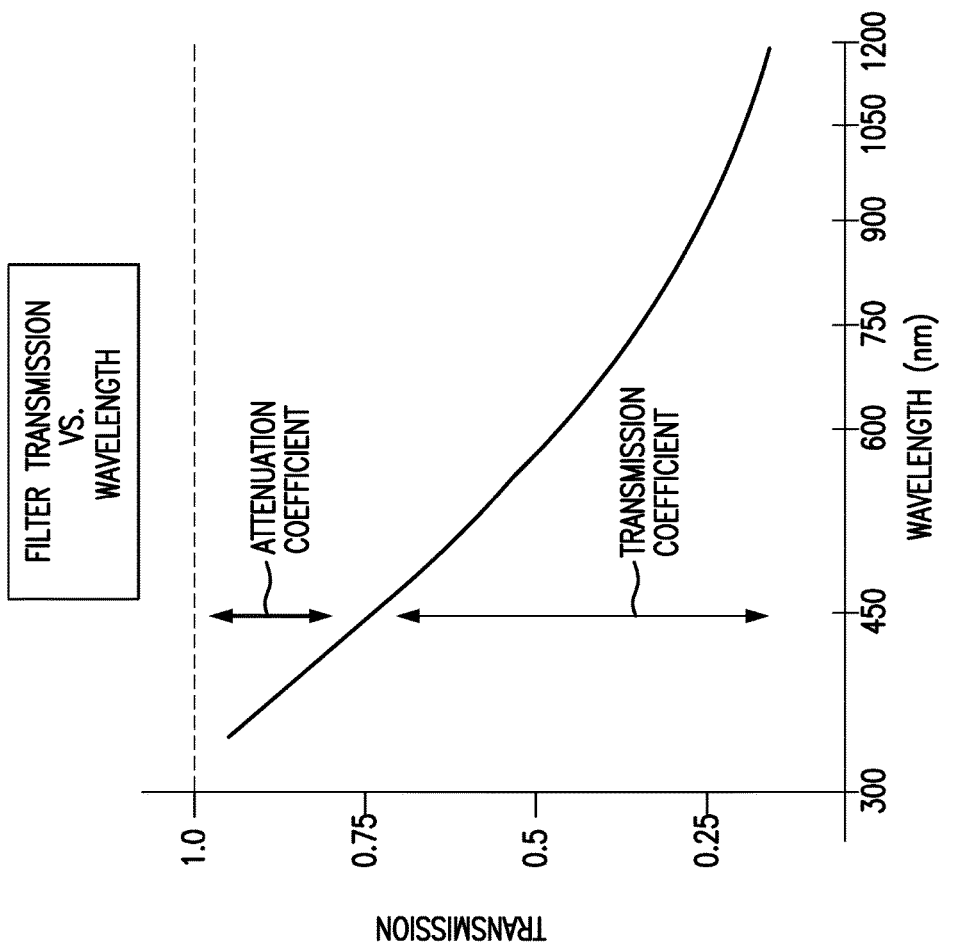
FIG. 3 is a graph of the attenuation and transmission coefficients of a filter of the wavelength detector of FIG. 1 and FIG. 2, showing the attenuation and transmission coefficients varying according to wavelength of incident laser illumination on the wavelength detector.

Referring to FIG. 3, a chart of transmission over an exemplary wavelength range is shown. Filter 108 (shown in FIG. 1) selectively attenuates incident laser illumination A (shown in FIG. 1) according to wavelength. In the illustrated exemplary embodiment, filter 108 attenuates longer wavelength illumination more heavily than shorter wavelength illumination in a wavelength range extending between about 350 nanometers and about 1200 nanometers. Attenuating wavelengths within the range of 350 nanometers and 1200 nanometers enables laser wavelength detector 100 (shown in FIG. 1) to recognize laser wavelengths with wavelengths sufficiently short to distract pilots, harm pilot eyesight, and/or damage sensors. Filter 108 attenuates incident laser illumination A within the exemplary range with an attenuation that ranges between 0.05 and about 0.9, thereby providing sufficient signal to noise in the resulting sensor output voltage sufficient to discern incident laser illumination A from solar background radiation S (shown in FIG. 1).

With reference to FIGS. 4-6, responsivities of first sensor 102 (shown in FIG. 1) and second sensor 104 (shown in FIG. 1) are shown for incident laser illumination A (shown in FIG. 1). Notably, for each wavelength within the predetermined wavelength range the response of the first sensor 102 differs from that of second sensor 104. Accordingly, the ratio of sensor response for a given wavelength is unique, as shown in FIG. 5, a given ratio of sensor being associated with a single wavelength of incident laser illumination A. In embodiments, the ratio to wavelength association is made available to processor 114 (shown in FIG. 1) in a lookup table 128 (shown in FIG. 6) and resident in memory 120 (shown in FIG. 1), laser wavelength detection 100 thereby being able to determine wavelength of unknown laser radiation incident thereon.

Figure 7:
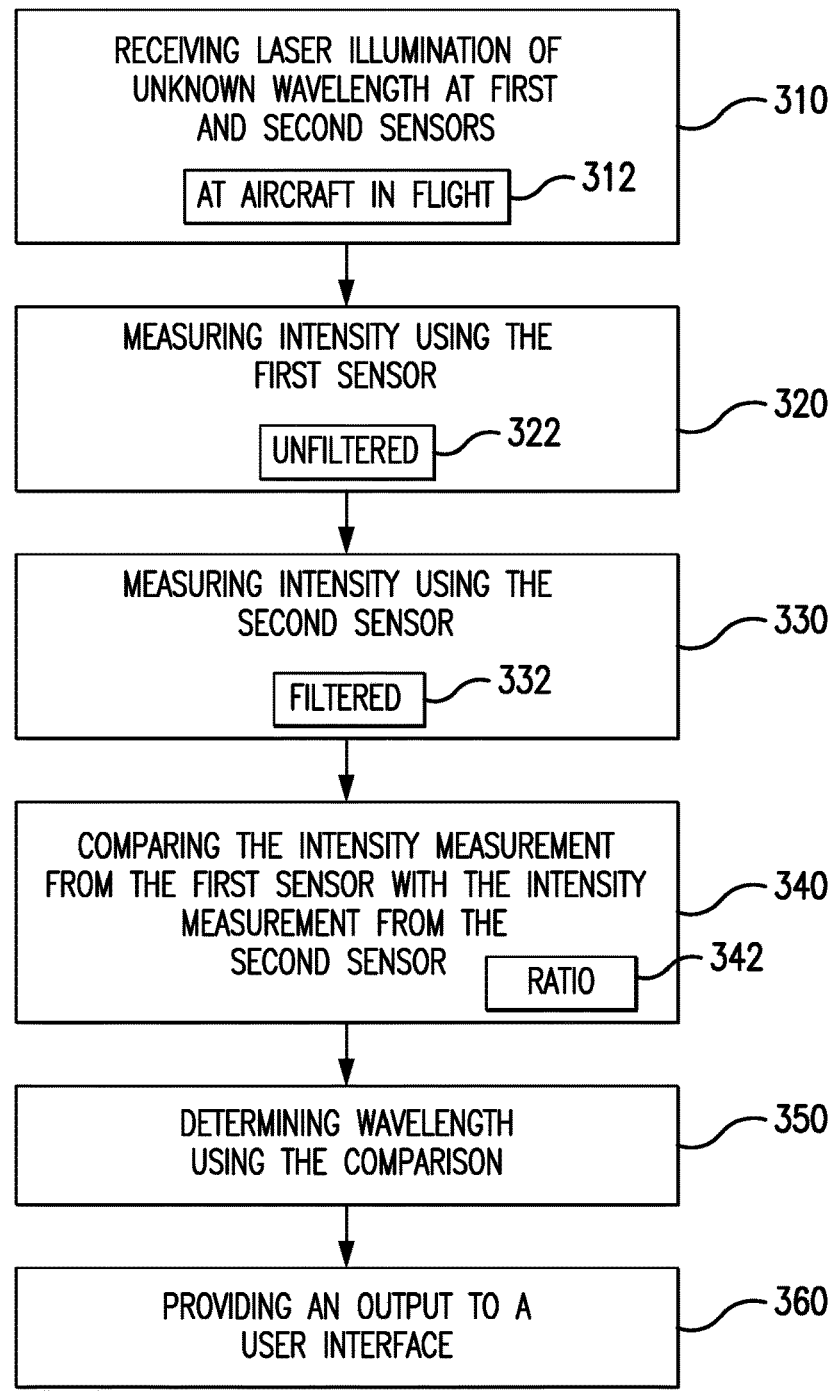
FIG. 7 is a chart of a method of detecting wavelength of laser illumination incident upon a laser wavelength detector, showing steps of the method.

With reference to FIG. 7, a method 300 of determining wavelength of pulsed laser illumination is shown. Method 300 includes receiving laser illumination of unknown wavelength at first and second sensors, e.g., first sensor 102 (shown in FIG. 1) and second sensor 104 (shown in FIG. 1), as shown with box 310. The received laser illumination may be pulsed at a wavelength that within or outside the visible wavelengths of the electromagnetic spectrum. The laser illumination can be received at an aircraft while in flight, e.g., at aircraft 4 (shown in FIG. 1), as shown with box 312.

Unfiltered intensity of the received laser illumination is measured using the first sensor, as shown with box 320. Filtered intensity of the received laser illumination is measured using the second sensor, as shown with box 322. Measured intensity reported by the first sensor is compared to the measured intensity reported by the second sensor, as shown with box 340. In embodiments, comparison is made by calculating a ratio of the intensity measurement reported by the first sensor and the intensity measurement reported by the second sensor, as shown with box 350. The calculated ratio is referenced against a lookup table including intensity ratios associated with laser wavelengths, e.g., lookup table 128 (shown in FIG. 1), and the unknown wavelength determined according to an association of the calculated wavelength ratio (or similar wavelength ratio) with a specific wavelength. Based on the determined wavelength, an output can be provided to a user interface, e.g., user interface 118 (shown in FIG. 1), as shown with box 360. For example, the output can indicate no countermeasures need be taken in response to the received laser illumination. Alternatively, the output can indicate that a countermeasure such as donning vision protective devices or executing an aircraft flight maneuver.

The methods and systems of the present disclosure, as described above and shown in the drawings, provide for laser wavelength detectors, detector system, and methods of wavelength detection with superior properties including pulsed wavelength discrimination using simple area silicon PIN photodiodes operating with reverse bias. While the apparatus and methods of the subject disclosure have been shown and described with reference to preferred embodiments, those skilled in the art will readily appreciate that changes and/or modifications may be made thereto without departing from the scope of the subject disclosure.

In embodiments described herein, wavelength detectors and methods of wavelength detection can characterize wavelength of a laser source over a relatively large field of view in the presence of a solar background. The wavelength detector can employ two or more photodiodes or other type of optical detector, which may be matched or unmatched, reducing cost of the wavelength detector. A first of the photodiodes is unfiltered, thereby receiving unfiltered incident laser illumination. A second of the photodiodes receives filtered incident laser illumination, the laser illumination traversing an intervening filter or predetermined (i.e. known) spectral performance. The sensors share a common sensor field of view, the field of view being limited in certain embodiments by external baffling and operable over a wide field of view. While silicon detectors are described herein, it is to be appreciated and understood that wavelength detectors can be implemented with any detector type over other spectral ranges. Because the second sensor has a filter of known spectral performance coupling the second sensor to incident laser illumination, outputs from both the first and second sensors will vary in a known way. If, during monochromatic illumination of both detectors, outputs from the first sensor and the second sensor are processed to produce a quotient of measured intensity of the respective filters, then a known and repeatable intensity ratio will be observed that is proportional to the wavelength of laser illumination incident upon the wavelength detector.

As will be appreciated by those of skill in the art in view of the present disclosure, the quotient of the measured sensor intensity at a given wavelength yields a unique result at a given wavelength that is proportional to the inverse of the filter transmission irrespective of the input irradiance. The spectral calibration curve, embodied as a lookup table in certain embodiments, allows for identification of the wavelength of the laser radiation incident upon the wavelength detector. Advantageously, over the entire dynamic range of the first and second sensors, there is no particular sensitivity to incident laser illumination since each detector sees the signal in common mode.

What is claimed is:

1. A laser wavelength detector, comprising:
   first and second sensors with a common field of view;
   a first external baffle disposed between the first sensor and the field of view and defining a first axis;
   a second external baffle disposed between the second sensor and the field of view and defining a second axis, the second axis parallel with the first axis;
   a filter optically coupling the second sensor to the field of view through the second external baffle, wherein the filter has at least two monochromatic attenuation coefficients such that a wavelength of laser illumination incident on the detector can be identified based upon a ratio of intensity measurements from the first sensor and the second sensor,
   wherein the first sensor is unfiltered and receives unfiltered laser illumination through the first external baffle, and
   wherein the filter has a negative attenuation coefficient to more heavily attenuate wavelengths of laser illumination in a visible wavelengths than infrared wavelengths received through the second external baffle.

2. The laser wavelength detector as recited in claim 1, wherein the filter has an attenuation coefficient that varies continuously between about 0.05 and about 0.9 within a predetermined wavelength range.

3. The laser wavelength detector as recited in claim 1, wherein the filter has an attenuation coefficient that varies continuously within a wavelength range extending between about 350 nanometers and about 1200 nanometers.

4. The laser wavelength detector as recited in claim 1, wherein the first sensor comprises a PIN photodetector.

5. The laser wavelength detector as recited in claim 1, wherein the second sensor comprises a PIN photodetector.

6. The laser wavelength detector as recited in claim 1, wherein an intensity response of the first sensor is matched to an intensity response of the second sensor.

7. The laser wavelength detector as recited in claim 1, wherein an intensity response of the first sensor is unmatched to the second sensor with the predetermined wavelength range.

8. The laser wavelength detector as recited in claim 1, further comprising:
   a control module communicative with the first sensor and the second sensor, wherein the control module is responsive to instructions recorded on a non-transitory machine readable memory to compare a ratio of intensity measurements from the first sensor and the second sensor to predetermined intensity measurement ratios to determine wavelength of pulsed laser radiation incident upon the laser wavelength detector.

9. The laser wavelength detector as recited in claim 8, further comprising a memory having recorded thereon a lookup table with a plurality of intensity ratios, wherein each of the plurality of intensity ratios is associated with a laser wavelength, wherein the control module is communicative with the memory.

10. The laser wavelength detector as recited in claim 8, further comprising a user interface operatively connected the control module, the user interface configured and adapted to provide indication of lasing of an aircraft cockpit.

11. A method of determining wavelength of a laser source, comprising:
   receiving laser illumination of unknown wavelength at first and second sensors, wherein angle of incidence of the laser illumination received at the first sensor is limited by a first external baffle, wherein angle of incidence of the laser illumination received at the second sensor is limited by a second external baffle;
   measuring intensity of the laser illumination using the first sensor;
   measuring intensity of the laser illumination using the second sensor; and
   comparing the intensity measurement of the first sensor with the intensity measurement of the second sensor; and
   determining wavelength of the laser illumination based on the comparison of the first sensor intensity measurement with the second sensor intensity measurement,
   wherein measuring intensity of laser illumination using the first sensor comprises measuring unfiltered laser illumination,
   wherein measuring intensity of the laser illumination using the second sensor comprises filtering the laser illumination according to a negative attenuation coefficient.

12. The method as recited in claim 11, wherein receiving laser illumination comprises receiving laser illumination at an aircraft while in flight.

13. The method as recited in claim 11, wherein comparing the first and second intensity measurements includes determining a ratio of intensity reported by the first sensor with intensity reported by the second sensor.

14. The method as recited in claim 11, further comprising dividing the received laser illumination into first and second portions, providing the first portion to the first sensor without filtering, and filtering the second portion prior to providing the second portion to the second sensor.

15. The method as recited in claim 11, further comprising providing an output to a user interface based on the determined wavelength.

16. A laser wavelength detector system, comprising:
   first and second sensors having a common field of view;
   a filter optically coupling the second sensor to the field of view, wherein the filter has at least two monochromatic attenuation coefficients of unequal magnitude, wherein the filter has a negative attenuation coefficient; and
   a first external baffle disposed between the first sensor and the field of view and defining a first axis;
   a second external baffle disposed between the second sensor and the field of view and defining a second axis, the second axis parallel with the first axis;
   a control module communicative with the first sensor and the second sensor, wherein the control module is responsive to instructions to:
      compare an intensity measurement from the first sensor with an intensity measurement from the second sensor; and
      determine wavelength of the laser illumination based on the comparison of the first sensor intensity measurement with the second sensor intensity measurement.

* * * * *